(12) United States Patent
Koshino (10) Patent No.: US 7,600,043 B2
(45) Date of Patent: Oct. 6, 2009

(54) INFORMATION APPLIANCE AND ACCESS CONTROL METHOD

(75) Inventor: Naozumi Koshino, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 506 days.

(21) Appl. No.: 11/402,963

(22) Filed: Apr. 13, 2006

(65) Prior Publication Data

US 2006/0235982 A1 Oct. 19, 2006

(30) Foreign Application Priority Data

Apr. 15, 2005 (JP) ............ P.2005-118598

(51) Int. Cl.
*G06F 15/16* (2006.01)
*G06F 15/173* (2006.01)

(52) U.S. Cl. ............ 709/245; 709/219; 709/223; 709/228

(58) Field of Classification Search ............ 709/203, 709/219, 223, 227, 238, 228, 245, 246
See application file for complete search history.

(56) References Cited

U.S. PATENT DOCUMENTS

| 6,198,479 | B1 * | 3/2001 | Humpleman et al. | 715/733 |
|---|---|---|---|---|
| 2003/0212800 | A1 * | 11/2003 | Jones et al. | 709/228 |
| 2005/0021786 | A1 * | 1/2005 | Kikkawa et al. | 709/229 |
| 2005/0022110 | A1 * | 1/2005 | Humpleman et al. | 715/501.1 |
| 2005/0120301 | A1 * | 6/2005 | Humpleman et al. | 715/515 |
| 2005/0216942 | A1 * | 9/2005 | Barton | 725/97 |
| 2006/0069911 | A1 * | 3/2006 | Takabayashi et al. | 713/150 |
| 2006/0127037 | A1 * | 6/2006 | Van Hoff et al. | 386/83 |
| 2006/0129938 | A1 * | 6/2006 | Humpleman et al. | 715/734 |
| 2007/0121580 | A1 * | 5/2007 | Forte et al. | 370/351 |

FOREIGN PATENT DOCUMENTS

| EP | 1 517 480 | 3/2005 |
|---|---|---|
| EP | 1 536 344 | 6/2005 |
| JP | 2004-334756 | 11/2004 |
| JP | 2004-343497 | 12/2004 |

* cited by examiner

*Primary Examiner*—Salad Abdullahi
*Assistant Examiner*—Sargon N Nano
(74) *Attorney, Agent, or Firm*—Finnegan, Henderson, Farabow, Garrett & Dunner, L.L.P.

(57) ABSTRACT

An information appliance that accesses content stored in a content server through a computer network is disclosed. The information appliance includes a first IP address information acquisition unit that acquires URI information of the content from the content server and extracts first IP address information contained in the URI information, a second IP address information acquisition unit that acquires a second IP address assigned to the information appliance, a determination unit that determines whether or not a network address part of the first IP address matches with a network address part of the second IP address, and a control unit that permits accessing the content server when determined that the network address parts of the first and the second IP address matches, and denies accessing the content server when determined otherwise.

10 Claims, 9 Drawing Sheets

EXAMPLE OF DENIAL (NETWORK ADDRESS PART MISMATCH)

ACCESS PERMISSION DETERMINATION METHOD TO CONTENT
(NETWORK ADDRESS PART COMPARISON)

FIG. 5B

ACCESS PERMISSION DETERMINATION METHOD TO CONTENT
(PRIVATE IP ADDRESS DETERMINATION ADDITION)

//INFORMATION APPLIANCE AND ACCESS CONTROL METHOD

CROSS-REFERENCE TO RELATED APPLICATIONS

This application is based upon and claims the benefit of priority from Japanese Patent Application No. 2005-118598, filed on Apr. 15, 2005, the entire contents of which are incorporated herein by reference.

BACKGROUND

1. Field

One embodiment of the invention relates to an access control method and in particular to an access control method for controlling an access to content data through a network.

2. Description of the Related Art

As known, the digitization of household electrical appliances has moved forward in recent years.

For example, in Japan, flat-screen digital TVs such as a liquid crystal TV and a plasma TV having functions of receiving and playing back satellite BS digital broadcasting and terrestrial digital broadcasting, an HDD-DVD recorder for receiving an analog broadcast program and recording the program in an internal HDD in digital form, and the like are springing into wide use in households.

Many of the digital household electrical appliances have a network connection function. It is imagined that in the future, for example, a content display such as a digital TV will operate as a client and the user will be able to easily enjoy content without moving to the place where the content physically exists by accessing the content stored in an HDD-DVD recorder having a server function in another room through a home network.

However, generally such a home network often is connected to the Internet through a router and the client may find out an unauthorized server releasing copyrighted content to the Internet and may access the content stored in the server depending on the settings of the router, resulting in an infringement of the copyright.

In order to cope with the above circumstance, generally the server often adopts a method of conducting machine authentication and access control so as to protect against the fraud of releasing copyrighted content to the Internet.

For example, a method of using the MAC address of the client as identification information and managing the identification information by the server, thereby restricting access to content from a client outside the home is known. (For example, refer to JP-A-2004-343497 (publication number of the corresponding European patent application is EP1517480A1))

A method of determining whether the client is in or outside the home based on whether or not access to the same physical medium within a short time can be shared as the determination criterion is also known. (For example, refer to JP-A-2004-334756 (publication number of the corresponding European patent application is EP1536344A1))

However, in the related art described above, if an unauthorized server other than the server installing the related art described above exists on the Internet, there is a possibility that the client in the home may access the unauthorized server.

There is also a possibility that the server belonging to the home network installing the related art described above may have settings rewritten by unauthorized access from the outside so that the client in the home is induced to an unauthorized server on the Internet or is caused to make unauthorized access to a server on the Internet.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

Figure 1:
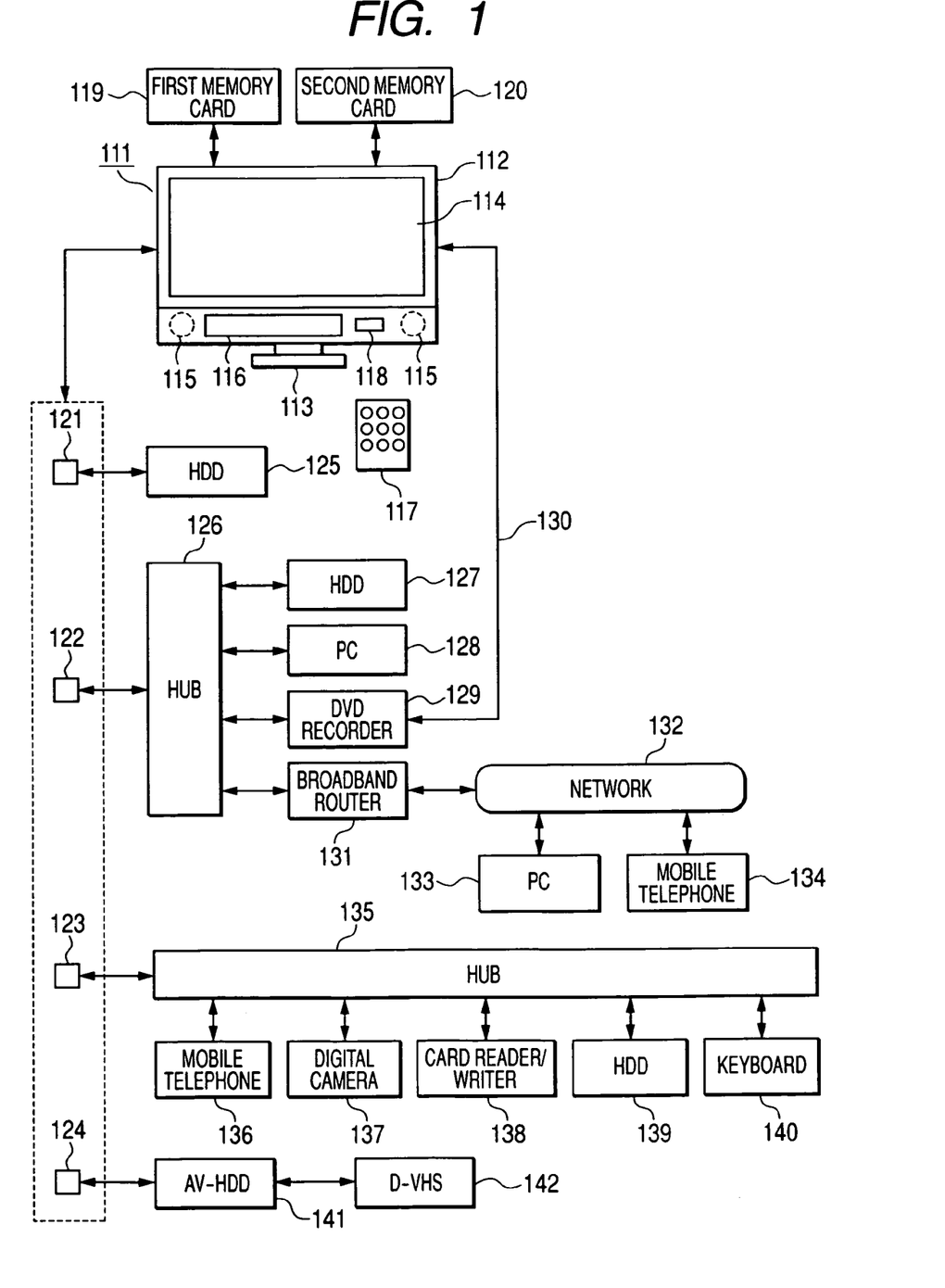
FIG. 1 is a diagram to describe an appearance of a digital TV broadcast receiver incorporating an access control apparatus and an access control method and an example of a network system configured centering on the digital TV broadcast receiver 111.

FIG. 1 schematically shows an appearance of a digital TV broadcast receiver 111 incorporating an access control apparatus (information appliance) and an access control method and an example of a network system configured centering on the digital TV broadcast receiver 111, described in the embodiment.

The digital TV broadcast receiver 111 mainly includes a thin-shaped cabinet 112 and a support bed 113 for supporting the cabinet 112 upright. For example, a flat panel video display 114 implemented as an SED (Surface-conduction Electron-emitter Display) display panel, a liquid crystal display panel, etc., speakers 115, an operation section 116, a light reception section 118 for receiving operation information transmitted from a remote control 117, and the like are installed in the cabinet 112.

For example, a first memory card 119 such as an SD (Secure Digital) memory card, an MMC (Multimedia Card), or a memory stick can be attached to and detached from the digital TV broadcast receiver 111, and information of a program, a photo, etc., is recorded and is played back on the first memory card 119.

Further, a second memory card (IC card) 120 recording contract information, etc., for example, can be attached to and detached from the digital TV broadcast receiver 111, and information is recorded and is played back on the second memory card 120.

The digital TV broadcast receiver 111 includes a first LAN (Local Area Network) terminal 121, a second LAN terminal 122, a USB (Universal Serial Bus) terminal 123, and an IEEE1394 terminal 124.

The first LAN terminal 121, which is used as a LAN compatible HDD dedicated port, is used to record and play back information through Ethernet (registered trademark) on a LAN compatible HDD 125 of connected NAS (Network Attached Storage).

Thus, the first LAN terminal 121 as the LAN compatible HDD dedicated port is provided, whereby information of a program based on HDTV image quality can be stably recorded on the HDD 125 without being affected by any other network environment, the network use situation, etc.

The second LAN terminal 122, which is used as a general LAN compatible port using Ethernet (registered trademark), is used to connect machines such as a LAN compatible HDD 127, a PC (Personal Computer) 128, and an HDD containing DVD (digital versatile disk) recorder 129, for example, through a hub 126 for transferring information to and from the machines.

The PC 128 is implemented as a UPnP (Universal Plug and Play) compatible device having a function to operate as a content server in the home network and further including service for providing URI (Uniform Resource Identifier) information required for accessing content.

A dedicated analog transmission line 130 needs to be provided for the DVD recorder 129 to transfer analog video and audio information to and from the digital TV broadcast receiver 111 because digital information communicated through the second LAN terminal 122 is information of only the control channel.

Further, the second LAN terminal 122 is used to connect a network 132, such as the Internet, through a broadband router 131 connected to the hub 126 for transferring information to and from a PC 133, a mobile telephone 134, etc., through the network 132.

The PC 133 is implemented as a UPnP compatible device having a function to operate as a content server and further including service for providing URI information required for accessing content.

The USB terminal 123, which is used as a general USB compatible port, is used to connect USB devices such as a mobile telephone 136, a digital camera 137, a card reader/writer 138 for a memory card, an HDD 139, and a keyboard 140, for example, through a hub 135 for transferring information to and from the USB devices.

Further, the IEEE1394 terminal 124 is used to connect an AV-HDD 141, a D (Digital)-VHS (Video Home System) 142, etc., for example, in series for transferring information to and from the machines.

Figure 2:
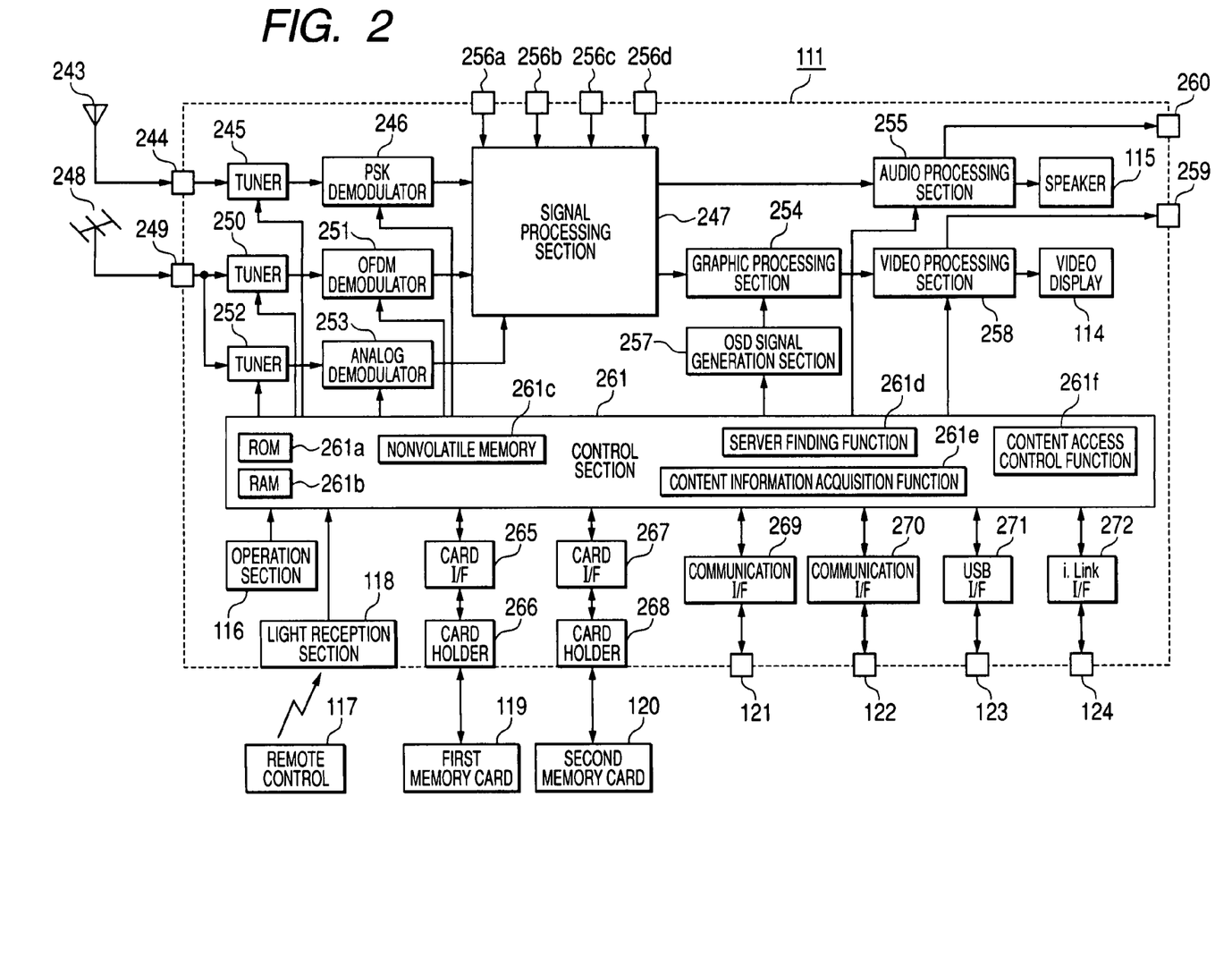
FIG. 2 is an exemplary block diagram to show a main signal processing channel of the digital TV broadcast receiver.

FIG. 2 shows the main signal processing channel of the digital TV broadcast receiver 111. That is, a satellite digital TV broadcast signal received at an antenna 243 for receiving BS/CS digital broadcasting is supplied through an input terminal 244 to a satellite digital broadcasting tuner 245, whereby the broadcast signal of any desired channel is selected.

The broadcast signal selected by the tuner 245 is supplied to a PSK (Phase Shift Keying) demodulator 246 and is demodulated into digital video and audio signals, which are then output to a signal processing section 247.

A terrestrial digital TV broadcast signal received at an antenna 248 for receiving terrestrial broadcasting is supplied through an input terminal 249 to a terrestrial digital broadcasting tuner 250, whereby the broadcast signal of any desired channel is selected.

The broadcast signal selected by the tuner 250 is supplied to an OFDM (Orthogonal Frequency Division Multiplexing) demodulator 251, for example, in Japan and is demodulated into digital video and audio signals, which are then output to the signal processing section 247.

A terrestrial analog TV broadcast signal received at the antenna 248 for receiving terrestrial broadcasting is supplied through the input terminal 249 to a terrestrial analog broadcasting tuner 252, whereby the broadcast signal of any desired channel is selected. The broadcast signal selected by the tuner 252 is supplied to an analog demodulator 253 and is demodulated into analog video and audio signals, which are then output to the signal processing section 247.

The signal processing section 247 selectively performs predetermined digital signal processing for the digital video and audio signals supplied from the PSK demodulator 246 and the OFDM demodulator 251, and outputs the signals to a graphic processing section 254 and an audio processing section 255.

A plurality of (in the FIG. 4) input terminals 256a, 256b, 256c, and 256d are connected to the signal processing section 247. The input terminals 256a to 256d make it possible to input analog video and audio signals from the outside of the digital TV broadcast receiver 111.

The signal processing section 247 selectively digitizes the analog video and audio signals supplied from the analog demodulator 253 and the input terminals 256a to 256d and performs predetermined digital signal processing for the digitized video and audio signals and then outputs the signals to the graphic processing section 254 and the audio processing section 255.

The graphic processing section 254 has a function of superposing an OSD (On Screen Display) signal generated by an OSD signal generation section 257 on the digital video signal supplied from the signal processing section 247 and outputting the resultant signal. The graphic processing section 254 can selectively output the output video signal of the signal processing section 247 and the output OSD signal of the OSD signal generation section 257 and can output both output signals in combination so as to form each a half of a screen.

The digital video signal output from the graphic processing section 254 is supplied to a video processing section 258. The video processing section 258 converts the input digital video signal into an analog video signal in a format that can be displayed on the video display 114 and then outputs the analog video signal to the video display 114 for displaying video and also outputs the signal to the outside through an output terminal 259.

The audio processing section 255 converts the input digital audio signal into an analog audio signal in a format that can be played back in the speakers 115 and then outputs the analog audio signal to the speakers 115 for playing back audio and also outputs the signal to the outside through an output terminal 260.

All operation of the digital TV broadcast receiver 111 including the various types of reception operation described above is controlled by a control section 261. The control section 261, which contains a CPU (Central Processing Unit), etc., receives operation information from the operation section 116 or receives operation information sent from the remote control 117 through the light reception section 118 and controls the sections so as to reflect the operation description.

In this case, the control section 261 uses mainly ROM (Read-Only Memory) 261a storing a control program executed by the CPU, RAM (Random Access Memory) 261b for providing a work area for the CPU, and nonvolatile memory 261c for storing various pieces of set information, control information, etc.

The control section 261 is connected through a card I/F (Interface) 265 to a cardholder 266 in which the first memory card 119 can be placed, whereby the control section 261 can transfer information to and from the first memory card 119 placed in the card holder 266 through the card I/F 265.

Further, the control section 261 is connected through a card I/F 267 to a card holder 268 in which the second memory card 120 can be placed, whereby the control section 261 can transfer information to and from the second memory card 120 placed in the card holder 268 through the card I/F 267.

The control section 261 is connected to the first LAN terminal 121 through a communication I/F 269, whereby the control section 261 can transfer information to and from the LAN compatible HDD 125 connected to the first LAN terminal 121 through the communication I/F 269. In this case, the control section 261 has a DHCP (Dynamic Host Configuration Protocol) server function and assigns an IP (Internet Protocol) address to the LAN compatible HDD 125 connected to the first LAN terminal 121 for control.

Further, the control section 261 is connected to the second LAN terminal 122 through a communication I/F 270, whereby the control section 261 can transfer information to and from the machines connected to the second LAN terminal 122 (see FIG. 1) through the communication I/F 270.

The control section 261 is also connected to the USB terminal 123 through a USB I/F 271, whereby the control section 261 can transfer information to and from the machines connected to the USB terminal 123 (see FIG. 1) through the USB I/F 271.

Further, the control section 261 is connected to the IEEE1394 terminal 124 through an IEEE1394 I/F 272, whereby the control section 261 can transfer information to and from the machines connected to the IEEE1394 terminal 124 (see FIG. 1) through the IEEE1394 I/F 272.

In the embodiment, a registration file describing the storage IDs (each containing IP address and device name) assigned to the HDD 125, the HDD 127, the PC 128, and the DVD recorder 129 at the initial registration time is stored in the HDD 125.

The storage IDs of the HDD 125, the HDD 127, the PC 128, and the DVD recorder 129 are stored in the nonvolatile memory 261c.

The control section 261 provides functions including (1) server finding function 261d using UPnP, (2) content information acquisition function 261e using UPnP, and (3) content access control function 261f.

(1) The control section 261 finds a UPnP compatible device on the network using a UPnP discovery function by the server finding function 261d. For example, the server finding function 261d finds the PC 128 using the UPnP discovery function.

(2) The control section 261 controls a UPnP compatible device using a UPnP control function by the content information acquisition function 261e and acquires URI information required for accessing the content in the UPnP compatible device. For example, the content information acquisition function 261e controls the PC 128 and acquires the URI information required for accessing the content stored in the HDD, etc., in the PC 128 from the PC 128.

(3) The control section 261 determines whether or not access to content is permitted by the content access control function 261f based on the IP address information of the server acquired by the server finding function 261d, the IP address information obtained from the URI information acquired by the content information acquisition function 261e, and the IP address and net mask assigned to the second LAN terminal 122 of the digital TV broadcast receiver 111. If the control section 261 determines that access is permitted, the control section 261 permits content access; if the control section 261 does not determine that access is permitted, the control section 261 displays a message to the effect that access cannot be permitted on the video display 114 as OSD.

Next, the processing operation in the configuration described above is as follows.

Figure 3:
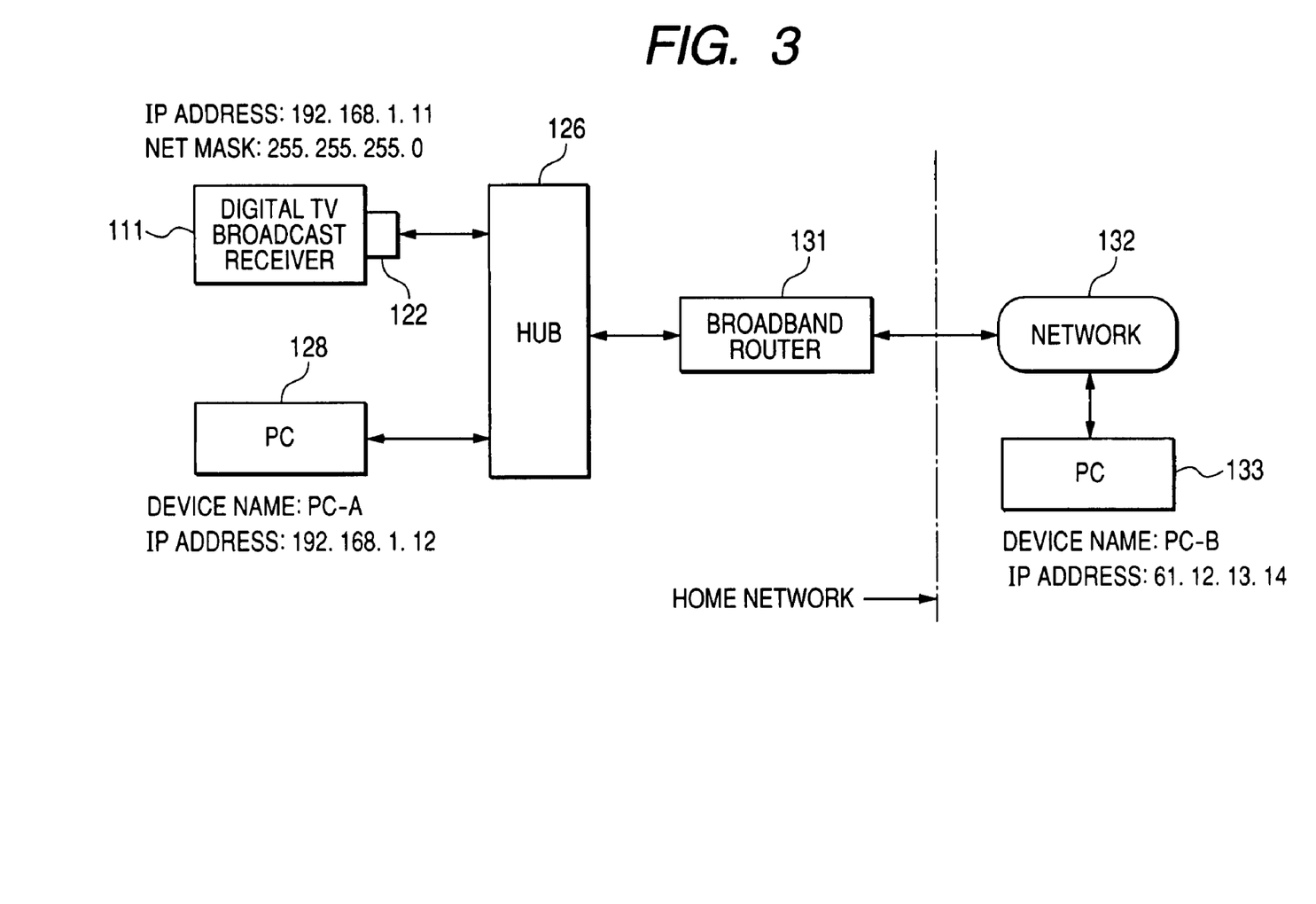
FIG. 3 is an exemplary block diagram provided by extracting the connection relationship of a part shown in FIG. 1.

FIG. 3 is a block diagram provided by extracting the connection relationship of a part of FIG. 1. The access control apparatus and the access control method of the invention will be discussed with FIG. 3.

It is assumed that the PC 133 is connected to the digital TV broadcast receiver 111 through the broadband router 131 and the network 132 as shown in FIG. 3. The PC 133 is implemented as a UPnP compatible device having the function to operate as a content server and further including the service for providing URI information required for accessing content.

If the network 132 is the Internet, usually the components to the broadband router 131 are installed in the home and the network 132 and the PC 133 are installed outside the home.

Figure 4:
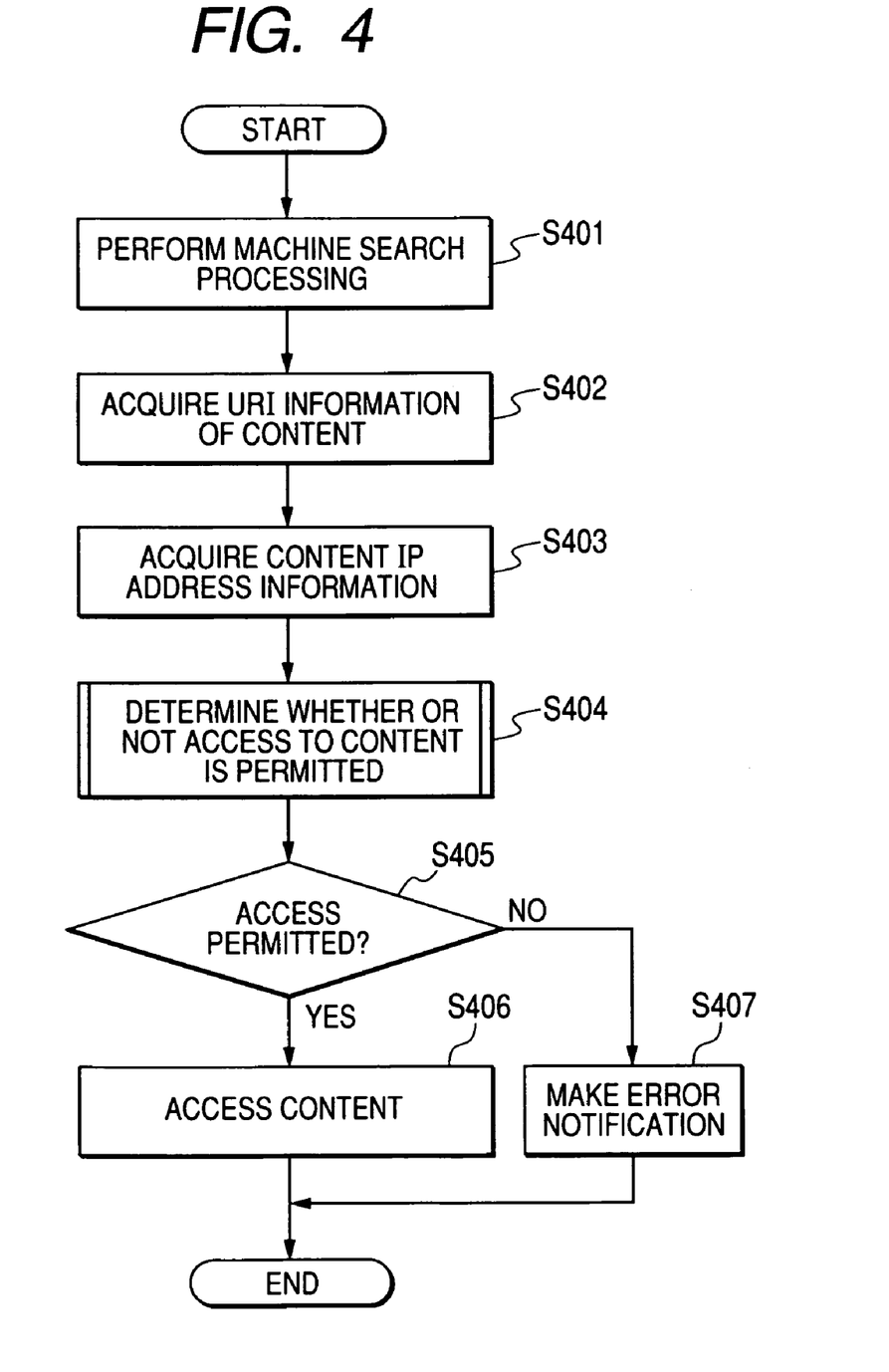
FIG. 4 is an exemplary flowchart to show a content playback processing procedure.

If the broadband router 131 is set so as to allow machine search using a network detection protocol of SSDP (Simple Service Discovery Protocol) used in a network entry message of machine or the UPnP discovery function to pass through regardless of from the network 132 of the Internet, etc., to the home network configured centering on the hub 126 or from the home network configured centering on the hub 126 to the network 132 of the Internet, etc., the control section 261 of the digital TV broadcast receiver 111 executes a content playback processing procedure shown in FIG. 4 in accordance with user operation.

Figure 7A:
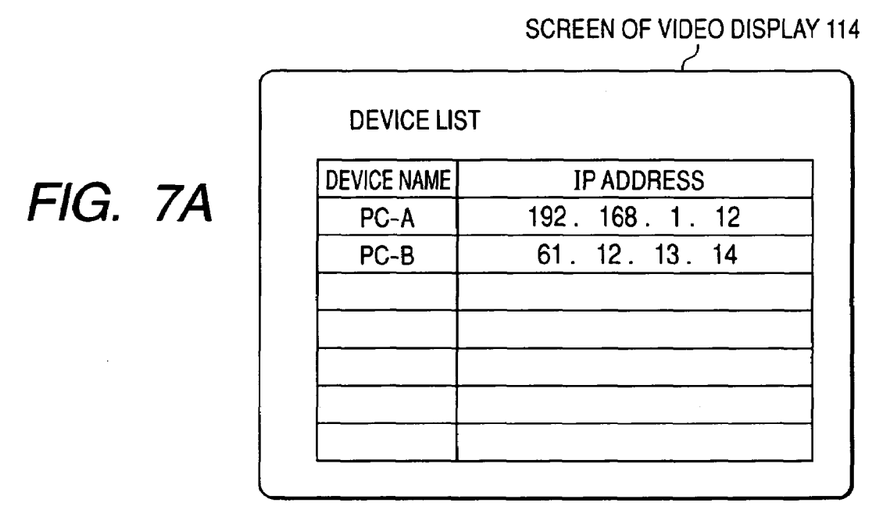
FIGS. 7A and 7B are exemplary drawings to show examples of device list displayed on a video display.

In FIG. 4, the control section 261 searches for a UPnP compatible device on the network using the server finding function 261d and displays the search result on the video display 114 (step S401). In the network configuration shown in FIG. 3, the two machines of the PC 128 disposed in the home network and the PC 133 disposed outside the home network are displayed as content servers on the video display 114, for example, as shown in FIG. 7A.

Figure 7B:
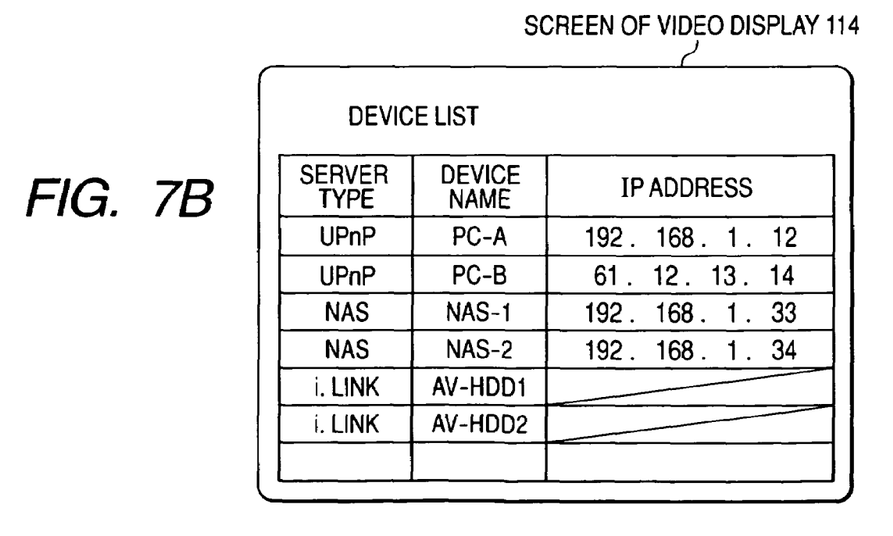

Information indicating the server type of content server may be added for display, for example, as shown in FIG. 7B. In the example in FIG. 7B, the three types of UPnP, NAS (Network Attached Storage), and IEEE1394 (when D-VHS, etc., is assumed to be a server) are displayed. Accordingly, the user can know the type of content server.

It is assumed that the digital TV broadcast receiver 111 is assigned 192.168.1.11 as the IP address and 255.255.255.0 as the net mask.

It is assumed that the PC 128 is assigned 192.168.1.12 as the IP address and PC-A as the device name of the UPnP compatible device.

It is assumed that the PC 133 is assigned 61.12.13.14 as the IP address and PC-B as the device name of the UPnP compatible device.

In this state, if the user enters a playback command of content stored in the HDD, etc., in the PC 133, the control section 261 controls UPnP compatible device on the network using the content information acquisition function 261e and acquires the URI information required for accessing the content (step S402).

Next, the control section 261 acquires the IP address information contained in the URI acquired at step S402, which will be hereinafter referred to as the content IP address (step S403).

Next, the control section 261 determines whether or not access is permitted based on the IP address information and the content IP address of the server and the IP address and the net mask assigned to the LAN terminal 122 of the digital TV broadcast receiver 111 (step S404).

Figure 9:
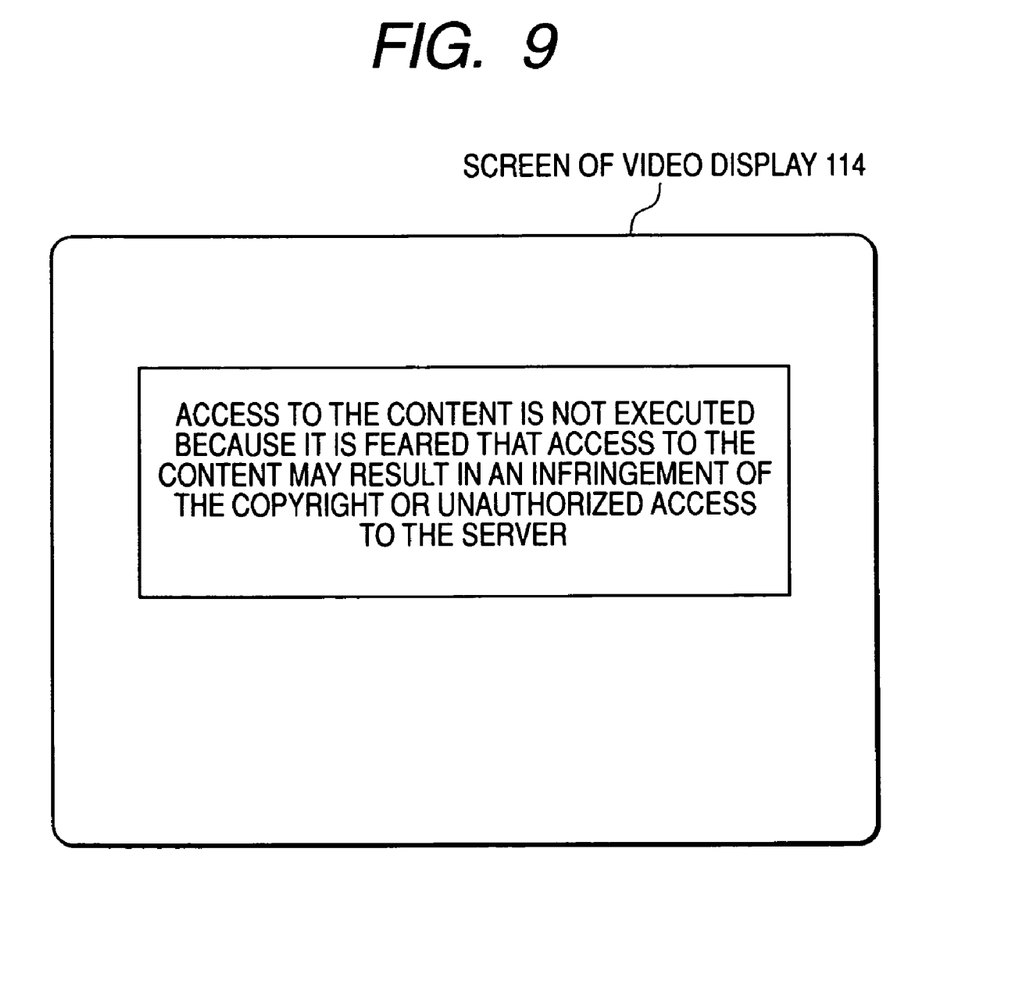
FIG. 9 is an exemplary drawing to show an example of a warning displayed on the video display.

Next, the control section 261 references the access permission determination result at step S404 (step S405) and actually accesses the content (step S406) if access is permitted. If access is not permitted, a warning is displayed on the video display 114, for example, as shown in FIG. 9 and the content is not accessed (step S407).

Figure 6:
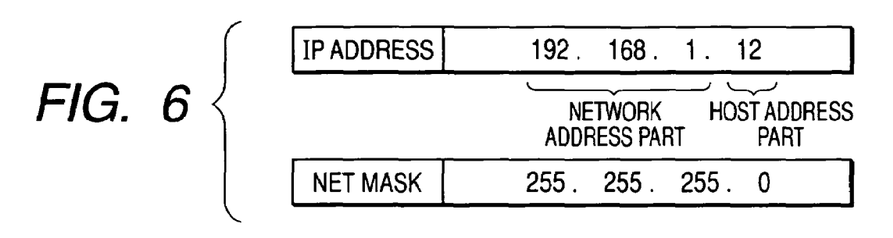
FIG. 6 is an exemplary drawing to describe a network address part and a host address part of an IP address.

In the specification, "network address part" refers to the portion of the bit string forming the IP address used to identify the network (subnet) managed by each organization. For example, if the IP address is "192.168.1.12" and the net mask is "255.255.255.0" as shown in FIG. 6, the high-order 24-bit portion becomes the network address part and the low-order eight-bit portion becomes host address part.

Specific examples of the access permission determination method at step S404 will be discussed in detail with FIGS. 5A-5D.

First Access Permission Determination Method

Figure 5A:
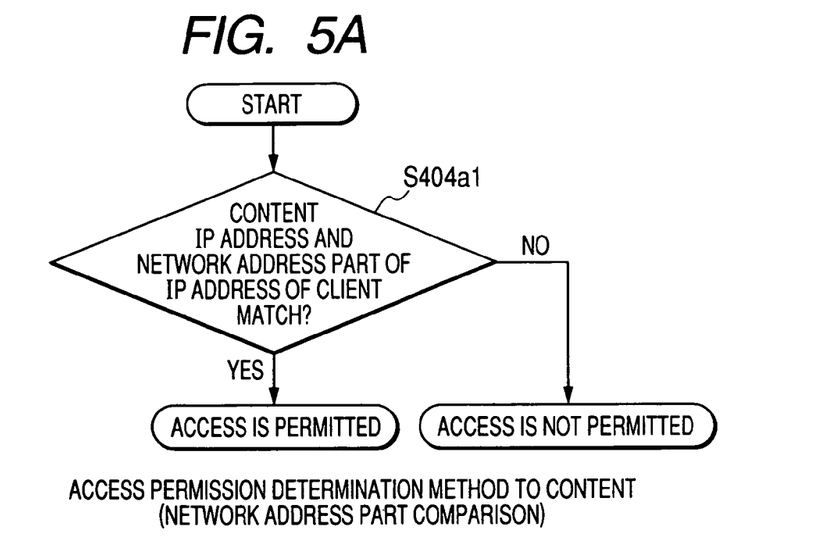
FIGS. 5A-5D are exemplary flowcharts to show specific access permission determination method at step S404 of the content playback processing procedure.

As a first access permission determination method, a comparison is made between the content IP address and the network address part of the IP address of the digital TV broadcast receiver 111 (client) (step S404a1), for example, as shown in FIG. 5A. If they match as shown in FIG. 8A, it is determined that access is permitted; if they do not match as shown in FIG. 8B, it is determined that access is not permitted.

Figure 8A:
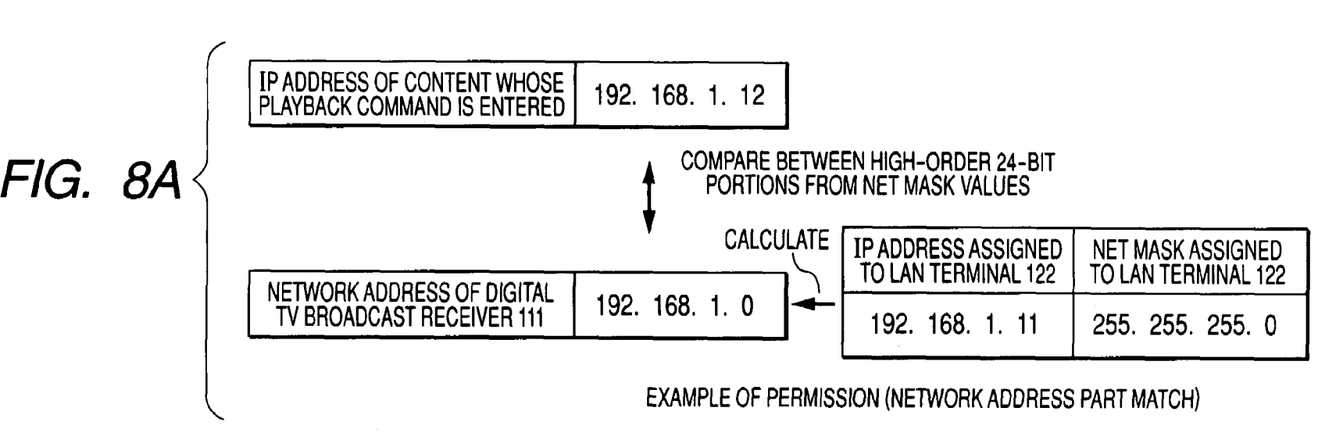
FIGS. 8A and 8B are exemplary drawings to describe network address part match/mismatch.
Figure 8B:
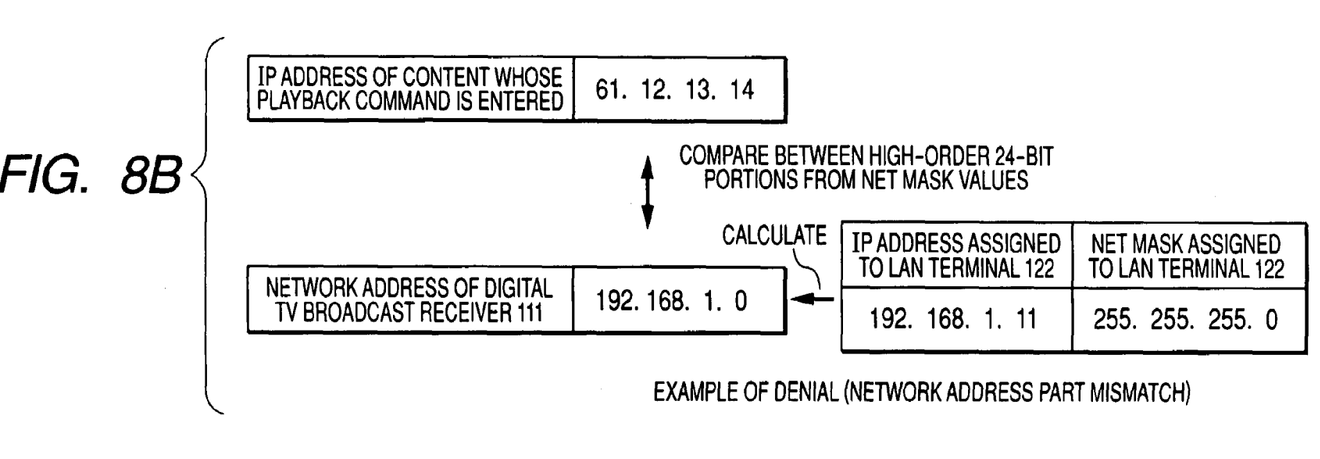

In FIG. 8A, since the subnet mask is "255.255.255.0," if a comparison is made between the high-order 24-bit portion of one and that of the other, they match because each is "192.168.1" and therefore access is permitted. In contrast, in FIG. 8B, if a comparison is made between the high-order 24-bit portion of one and that of the other, they do not match because one is "192.168.1" and the other is "61.12.13" and therefore access is not permitted.

Second Access Permission Determination Method

Figure 5B:
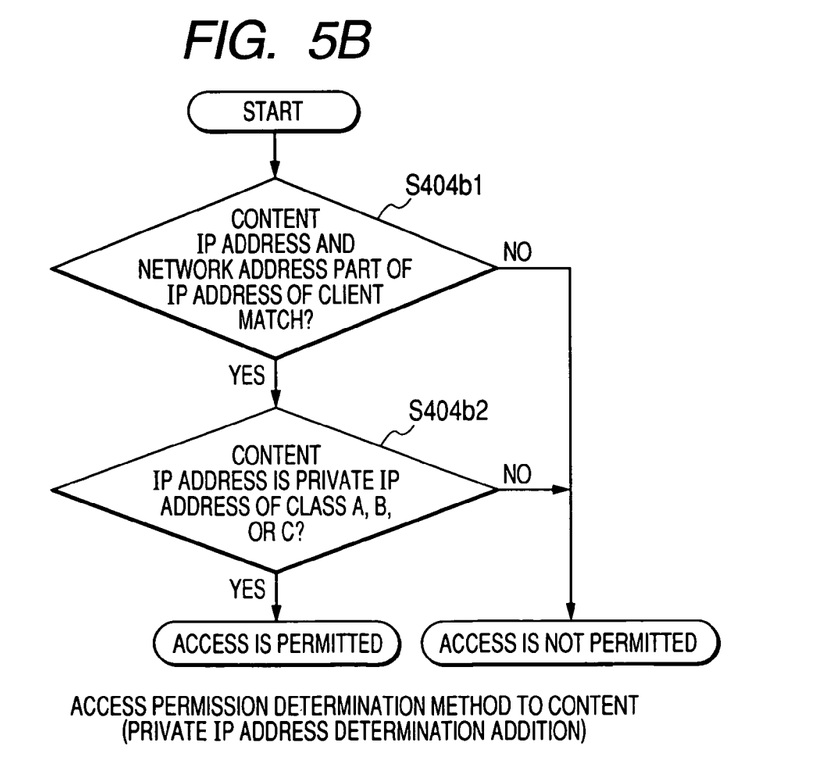

As a second access permission determination method, for example, as shown in FIG. 5B, a comparison is made between the content IP address and the network address part of the IP address of the digital TV broadcast receiver 111 (client) (step S404b1) and if they match, further whether or not the content IP address is private IP address of class A, B, or C is determined (step S404b2) and if the content IP address is private IP address of class A, B, or C, it is determined that access is permitted; otherwise, it is determined that access is not permitted.

Step S404b2 is added, whereby access to a content server on the Internet can be prevented reliably.

Third Access Permission Determination Method

Figure 5C:
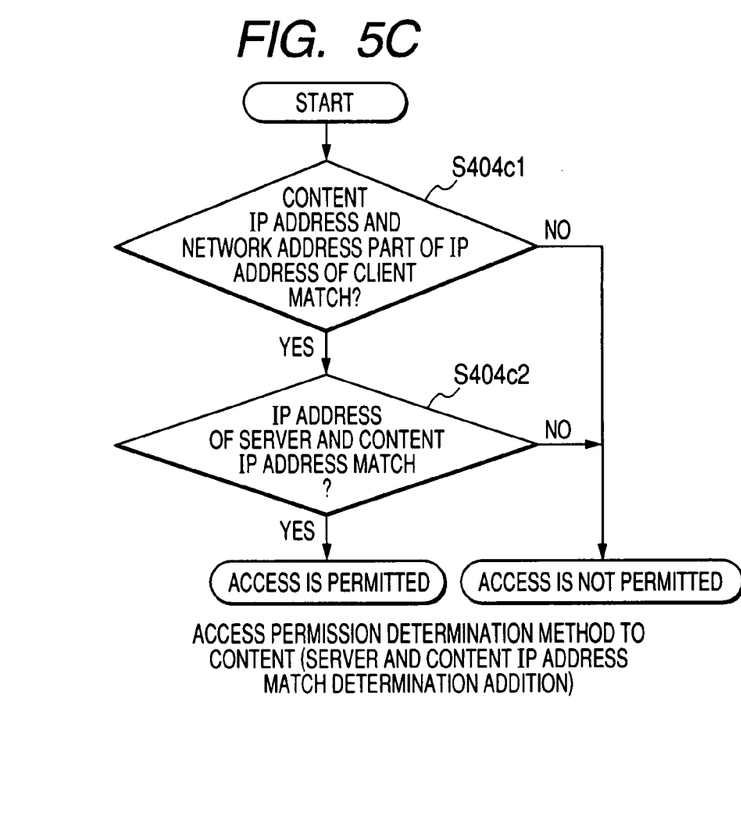

As a third access permission determination method, for example, as shown in FIG. 5C, a comparison is made between the content IP address and the network address part of the IP address of the digital TV broadcast receiver 111 (client) (step S404c1) and if they match, further whether or not the IP address of the server matches the content IP address is determined (step S404c2) and if they match, it is determined that access is permitted; if they do not match, it is determined that access is not permitted.

According to the third access permission determination method, it can be confirmed that the content server for providing content information and the server for actually providing content match.

Fourth Access Permission Determination Method

Figure 5D:
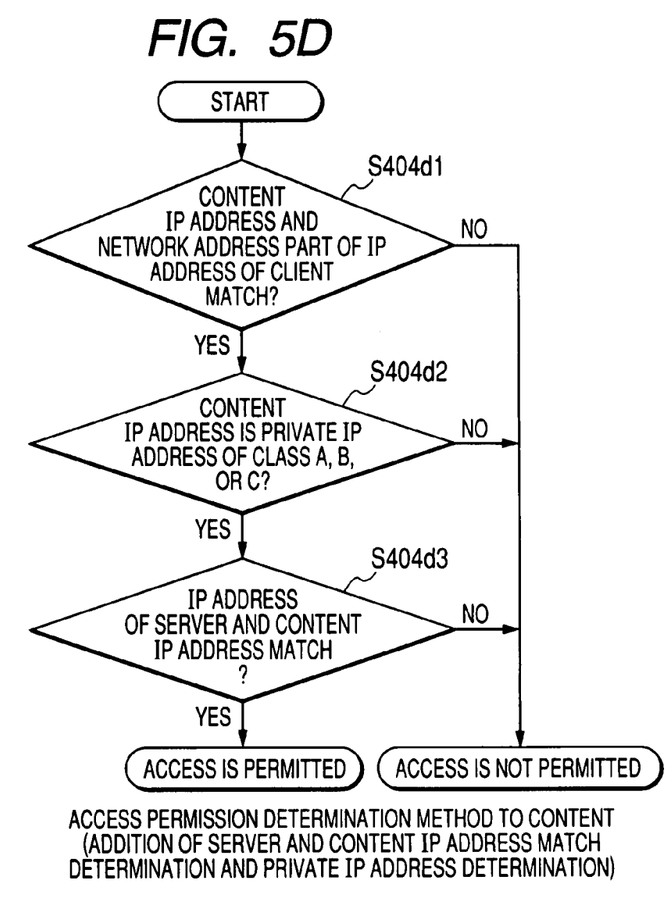

As a fourth access permission determination method, for example, as shown in FIG. 5D, a comparison is made between the content IP address and the network address part of the IP address of the digital TV broadcast receiver 111 (client) (step S404d1) and if they match, further whether or not the content IP address is private IP address of class A, B, or C is determined (step S404d2) and if the content IP address is private IP address of class A, B, or C, further whether or not the IP address of the server matches the content IP address is determined (step S404d3) and if they match, it is determined that access is permitted; if they do not match, it is determined that access is not permitted.

Since each class can take the following values, the address ranges are previously stored in memory, etc., and a comparison is made, whereby whether or not each address is in any of the address ranges can be determined:

Class A: 10.0.0.0 to 10.255.255.255
Class B: 172.16.0.0 to 172.31.255.255
Class C: 192.168.0.0 to 192.168.255.255

In the network configuration described above, as for the PC 128, the content IP address and the network address part match as shown in FIG. 8A and thus the content can be accessed; as for the PC 133, the content IP address and the network address part do not match as shown in FIG. 8B and thus a warning is displayed on the video display 114, as shown in FIG. 9.

In the network configuration described above, for example, if the content information providing module of the PC 128 is rewritten by unauthorized access and such URI information to induce to any other content server than the PC 128 is provided for the digital TV broadcast receiver 111, when the content server belongs to the network 132 such as the Internet, if any of the access permission determination methods shown in FIG. 5A to FIG. 5D is adopted at step S404 in accordance with the playback processing procedure shown in FIG. 4, the content IP address and the network address part do not match at step S404a1, S404b1, S404c1, S404d1 and therefore access is not executed and a warning is displayed as shown in FIG. 9 at step S407.

Even if the content server belongs to the local side of the broadband router 131, if the access permission determination method shown in FIG. 5C or FIG. 5D is adopted at step S404, it is determined that access is not permitted in the match determination between the content IP address and the IP address of the server at step S404c2 or S404d3 and a warning is displayed as shown in FIG. 9 at step S407.

In the network configuration described above, for example, if the broadband router 131 operates as a hub and a global IP address is assigned to the LAN terminal 122 of the digital TV broadcast receiver 111 for direct connection to the Internet, content server can be found, but if the access permission determination method shown in FIG. 5B or FIG. 5D is adopted at step S404 at the content access time, it is determined that access is not permitted in the private IP address determination at step S404b2 or S404d2 and a warning is displayed as shown in FIG. 9 at step S407.

Accordingly, a client in the home such as the digital TV broadcast receiver 111 can be prevented from accessing copyrighted content stored in a content server such as the PC 133 on the network 132 such as the Internet and infringing the copyright.

If a content server in the home such as the PC 128 induces a client to accessing a server on the Internet or another server in the home, for example, for the purpose of DoS (Denial of Services) because the content server undergoes unauthorized access or becomes virus-infected, the action can be prevented effectively.

As described above with reference to the embodiment, in a home network environment connected to the Internet through a router, if an unauthorized server releasing copyrighted content to the Internet exists, the client (information appliance) belonging to the home network can be prevented from accessing the content and infringing the copyright.

If the setting of the server belonging to the home network is rewritten illegally, the client belonging to the home network can be prevented from being induced to a server on the Internet.

The present invention relating to the apparatus also holds as the present invention relating to a method and the invention relating to the method also holds as the present invention relating to the apparatus.

The present invention relating to the apparatus or the method also holds as a program for causing a computer to execute a procedure essential to the invention (or causing a computer to function as respective units or causing a computer to provide functions served by the respective units) and also holds as a computer-readable record medium recording the program.

According to the present invention, there is provided an information appliance and an access control method that prevents, under circumstance where an unauthorized server other than the server installing the related art described above exists on the Internet, a home client from accessing the unauthorized server and infringing the copyright even if a server belonging to the home network has settings rewritten illegally.

There is also provided a content access control method, if an unauthorized server other than the server installing the related art described above exists on the Internet, for preventing unauthorized access to a normal server for causing a fault to occur.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

While certain embodiment of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information appliance that accesses content stored in a content server through a computer network, the information appliance comprising:
    a first IP address acquisition unit that acquires URI information of the content from the content server and extracts a content server IP address from the URI information, the content server IP address including a network address bit string identifying a subnet that includes the content server and a host address bit string identifying the content server;
    a second IP address acquisition unit that acquires an appliance IP address assigned to the information appliance, the appliance IP address including a network address bit string identifying a subnet that includes the information appliance and a host address bit string identifying the information appliance;
    a determination unit that determines whether or not the network address bit string of the content server IP address matches the network address bit string of the appliance IP address; and
    a control unit that permits access to the content server when the network address bit string of the content server IP address matches the network address bit string of the appliance IP address, and denies access to the content server when the network address bit string of the content server does not match the network address bit string of the appliance IP address.

2. The information appliance according to claim 1, further comprising a private IP address determination unit that determines whether or not the content server IP address is a private IP address of class A, B, or C,
    wherein the control unit permits access to the content server when the content server IP address is a private IP address of class A, B, or C, and otherwise denies access to the content server.

3. The information appliance according to claim 1, further comprising:
    a third IP address information acquisition unit that acquires a third IP address assigned to the content server; and
    an IP address determination unit that determines whether or not the third IP address matches the content server IP address,
    wherein the control unit permits access to the content server when the third IP address matches the content server IP address, and otherwise denies access to the content server.

4. The information appliance according to claim 1, further comprising:
    a content reception unit that receives content stored in the content server;
    a signal processing unit that performs signal processing to display the content received by the content reception unit; and
    a display unit that displays the content.

5. The information appliance according to claim 4, wherein when the control unit denies access to the content server, the control unit controls the display unit to display an image indicating that the access to the content server is denied.

6. An access control method, executing on a hardware, for an information appliance that accesses content stored in a content server through a computer network, the access control method comprising:
    acquiring URI information of the content from the content server;
    extracting a content server IP address from the URI information, the content server IP address including a network address bit string identifying a subnet that includes the content server and a host address bit string identifying the content server;
    acquiring an appliance IP address assigned to the information appliance, the appliance IP address including a network address bit string identifying a subnet that includes the information appliance and a host address bit string identifying the information appliance;

determining whether or not the network address bit string of the content server IP address matches the network address bit string of the appliance second IP address; and permitting access to the content server when the network address bit string of the content server IP address matches the network address bit string of the appliance IP address, and denying access to the content server when the network address bit string of the content server does not match the network address bit string of the appliance IP address.

7. The access control method according to claim 6, further comprising determining whether or not the content server IP address is a private IP address of class A, B, or C, wherein the access to the content server is permitted when the content server IP address is a private IP address of class A, B, or C, and otherwise is denied.

8. The access control method according to claim 6, further comprising:

acquiring a third IP address assigned to the content server; and determining whether or not the third IP address matches the content server IP address, wherein the access to the content server is permitted when the third IP address matches the content server IP address, and otherwise is denied.

9. The access control method according to claim 6, further comprising:

receiving content stored in the content server;

performing signal processing to display the received content; and displaying the content.

10. The access control method according to claim 9, wherein when the access to the content server is denied, an image is displayed indicating that the access to the content server is denied.

* * * * *